(12) United States Patent
Kley et al.

(10) Patent No.: US 9,007,686 B2
(45) Date of Patent: Apr. 14, 2015

(54) DIFFRACTIVE ELEMENT WITH A HIGH DEGREE OF WAVEFRONT FLATNESS

(75) Inventors: Ernst-Bernhard Kley, Jena (DE); Uwe Detlef Zeitner, Weimar (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 528 days.

(21) Appl. No.: 12/933,158

(22) PCT Filed: Mar. 17, 2009

(86) PCT No.: PCT/EP2009/001969
§ 371 (c)(1),
(2), (4) Date: Apr. 12, 2011

(87) PCT Pub. No.: WO2009/115304
PCT Pub. Date: Sep. 24, 2009

(65) Prior Publication Data
US 2011/0188118 A1 Aug. 4, 2011

(30) Foreign Application Priority Data

Mar. 18, 2008 (DE) .......................... 10 2008 014 778

(51) Int. Cl.
*G02B 5/18* (2006.01)
(52) U.S. Cl.
CPC ............... *G02B 5/1847* (2013.01); *G02B 5/18* (2013.01); *G02B 5/1814* (2013.01); *G02B 5/1866* (2013.01)

(58) Field of Classification Search
USPC ...................... 359/2, 576, 569; 283/86; 430/1
See application file for complete search history.

(56) References Cited

U.S. PATENT DOCUMENTS 3,698,795 A 10/1972 Flint
4,576,439 A * 3/1986 Gale et al. ..................... 359/572
(Continued)

FOREIGN PATENT DOCUMENTS

| DE | 10 2006 030 865 | 1/2007 |
| JP | 2003294947 | 10/2003 |
| JP | 2004226610 | 8/2004 |

OTHER PUBLICATIONS

International Search Report and Written Opinion issued in PCT/EP2009/001969, mailed Oct. 26, 2009, 18 pages, with English Translation.

(Continued)

*Primary Examiner* — Audrey Y Chang
(74) *Attorney, Agent, or Firm* — Faegre Baker Daniels LLP

(57) ABSTRACT

The present invention relates to the creation of a diffractive element that has a high degree of wavefront flatness. The diffractive element has a flat functional substrate with a first side, whereby a fine structure is arranged on or in this first side, and whereby the first side of this functional substrate is arranged on a flat carrier substrate, whereby the carrier substrate has a higher degree of rigidity than the functional substrate.

12 Claims, 2 Drawing Sheets

(56) References Cited

U.S. PATENT DOCUMENTS

| | | | |
|---|---|---|---|
| 4,921,319 | A | 5/1990 | Mallik |
| 5,856,048 | A * | 1/1999 | Tahara et al. ............. 430/1 |
| 6,238,763 | B1 * | 5/2001 | Sandstrom ............. 428/64.1 |
| 6,765,724 | B1 | 7/2004 | Kramer |
| 7,435,979 | B2 * | 10/2008 | Ryzi et al. ............. 250/492.22 |
| 2003/0016447 | A1 | 1/2003 | Kato et al. |
| 2003/0032039 | A1 | 2/2003 | Cunningham et al. |
| 2005/0231806 | A1 | 10/2005 | Barton et al. |
| 2005/0260349 | A1 | 11/2005 | Pawlowski et al. |
| 2007/0008595 | A1 | 1/2007 | Watanabe et al. |

OTHER PUBLICATIONS

Stern, M.B., "Binary Optics Fabrication," H.P. Herzig in "Micro Optics Elements, systems and applications" (Taylor & Francis, 1997), pp. 53-85.

U.D. Zeitner and E.B. Kley in "Advanced Lithography for Micro Optics" (2006), 8 pgs.

\* cited by examiner

DIFFRACTIVE ELEMENT WITH A HIGH DEGREE OF WAVEFRONT FLATNESS

CROSS-REFERENCE TO RELATED APPLICATIONS

This application claims priority to PCT Application Ser. No. PCT/EP2009/001969, filed Mar. 17, 2009, which claims priority to DE 10 2008 014 778.8, filed Mar. 18, 2008, each of which is herein incorporated by reference in its entirety.

FIELD OF THE INVENTION

The present invention relates to diffractive elements. More specifically, the present invention relates to a diffractive element with a high degree of wavefront flatness.

BACKGROUND

Holograms are an important component for a series of applications of diffractive elements in the area of optics, optical diffraction grating and/or other diffractive elements. Conventionally, the production of diffractive elements is accomplished by applying a fine structure to a flat substrate using lithographic processes such as electron beam lithography, laser lithography or photolithography, as described by H. P. Herzig in "Micro Optics Elements, systems and applications" (Taylor & Francis, 1997).

One consideration for a diffractive element is that the optical function that is to be created by the diffractive element is created with as high a degree of wavefront precision as possible. This is an important characteristic of the quality of the diffractive element itself, and thus the quality of the result of the applications that are being implemented.

Theoretically, a high degree of precision of the wavefront can be achieved according to U. D. Zeitner and E. B. Kley in "Advanced Lithography for Micro Optics" (2006), such that a very precise lateral positioning of the fine structures is warranted.

In practice, the achievable precision of the wavefront depends, however, not only on the processing method, but also on the quality of the substrates that are used. It can be said in general, that the wavefront, which is created with the help of a diffractive element, becomes correspondingly better with increasing flatness of the surface of the substrate that is used for the diffractive element. A further important characteristic of the substrate is that the flat substrate may not be deformable, but it is to have a certain rigidity. A high degree of flatness as well as also a high degree of rigidity of the flat substrate is said to be obtainable by a corresponding thickness. However, the use of thick, flat substrates represents a problem in the production of diffractive elements since, for conventional lithographic systems, only thicknesses of a few millimeters are permissible. This limitation on the thickness of the substrates is due to the handling of the substrates during lacquering and development (for the frequently used spin coating process, the substrates are rotated at a high rotational speed), the substrate mass that can still be moved with sufficient precision on the highly precise x-y tables of the lithographic systems, as well as the thermal relationships, which play a role in the structural transfer into the substrate by means of ion etching. When the flat substrates are too thick, the heat that is introduced by the ion bombardment cannot be sufficiently dissipated, which can lead to a degeneration of the resist mask.

The low thickness of the flat substrate (e.g., a few millimeters) is less significant for the lithography process, since during the lithography process, the thin flat substrate is brought to a sufficient degree of flatness by means of suitable bracketing methods such as, for example, by vacuum suction or by electrostatic suction onto an extremely flat substrate retainer. However, when separating the flat substrate from the bracketing of the respective lithographic system, the desired flatness of the flat substrate is lost. The flatness of the flat substrate that carries the fine structure is, however, a basic requirement for optic applications. Moreover, the rigidity of the flat substrate should be configured in such a way that as much as possible, no deformation of the diffractive element occurs due to external influences such as gravitation, vibration, thrusts and other influences that worsen the optical function.

SUMMARY OF THE INVENTION

In one aspect, a diffractive element includes a flat functional substrate and a flat carrier substrate. The flat functional substrate has a first side and a second side, and a fine structure is disposed on or in the first side of the flat functional substrate. The flat carrier substrate is coupled to the first side of the functional substrate. The carrier substrate has a higher degree of rigidity than the functional substrate.

In another aspect, a method for manufacturing a diffractive element includes providing a flat functional substrate, forming a fine structure in or on a first side of the flat functional substrate, and coupling the first side of the functional substrate to a flat carrier substrate. The carrier substrate is more rigid than the functional substrate.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
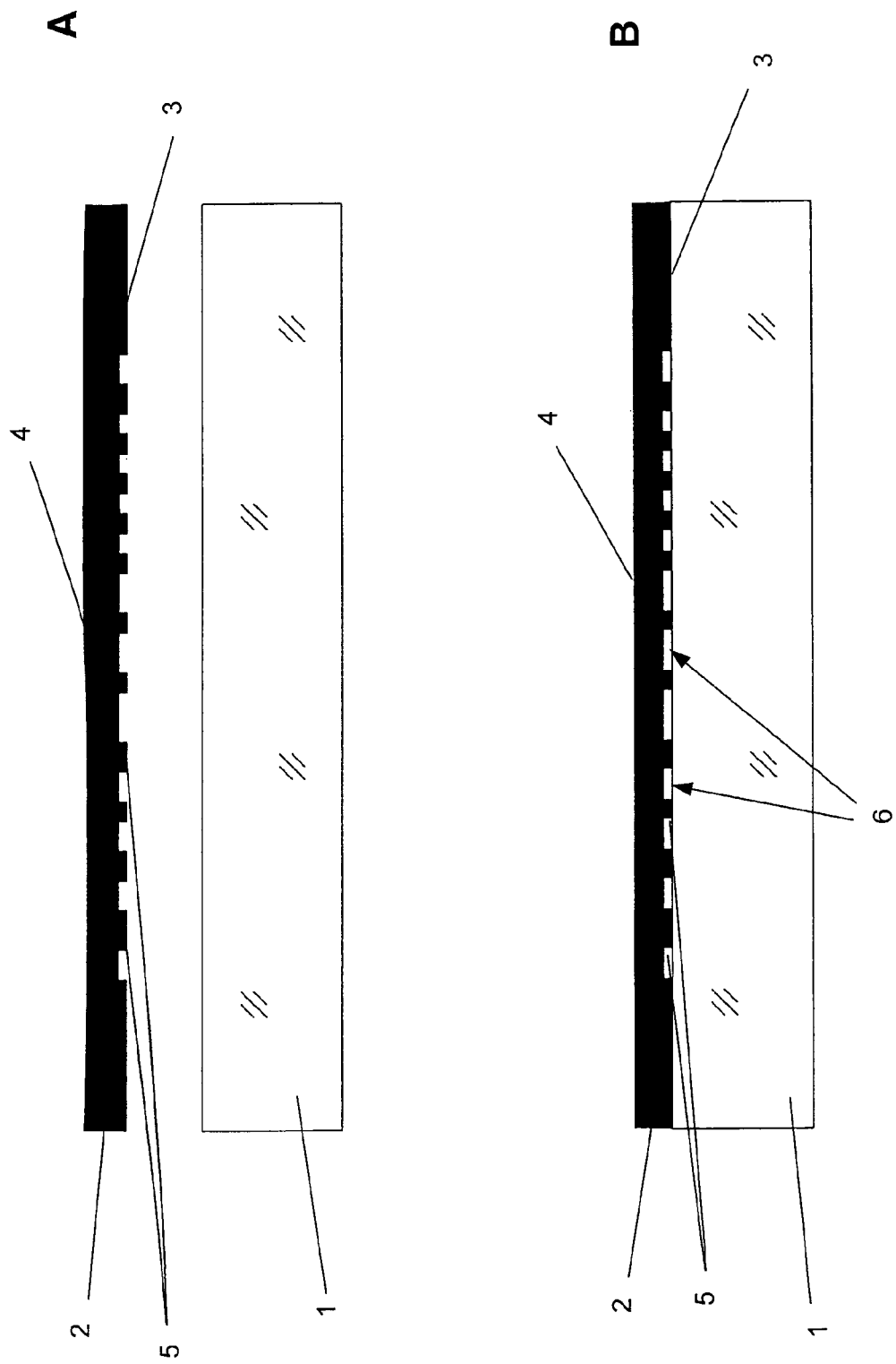
FIGS. 1A-B are cross-sectional views illustrating steps in a method for the production of a diffractive element.

FIG. 1A shows a cross-section through the components of a diffractive element. A thicker, carrier substrate 1 that has a thickness of 30 mm is shown relative to a thinner functional layer 2 having a thickness of 0.8 mm. In some embodiments, the diameter of the functional substrate 2, as well as the carrier substrate 1, is 300 mm. A fine structure 5 is arranged on or in the first side 3 of the functional level 2 facing the carrier layer 1. The surface of the second side 4 of the functional substrate has deviations from the flatness of an ideal plane of about 20 to 50 μm. The deviations of the carrier substrate 1 from an ideal flatness level are less than about 500 nm.

FIG. 1B shows a cross-section through the diffractive element after connecting the carrier layer 1 with the first side 3 of the functional substrate 2 that carries the fine structure 5. When connecting both flat substrates by vacuum suction, evacuated sections form due to the fine structure 5 between carrier substrate 1 and first side 3 of the functional substrate 2. The surface of the second side 4 of the functional substrate 2 is drawn flat due to the connection of both flat substrates. The deviations of the surface of the second side 4 of the functional substrate 2 from an ideal flatness level are reduced to a maximum of about 500 nm.

Figure 2:
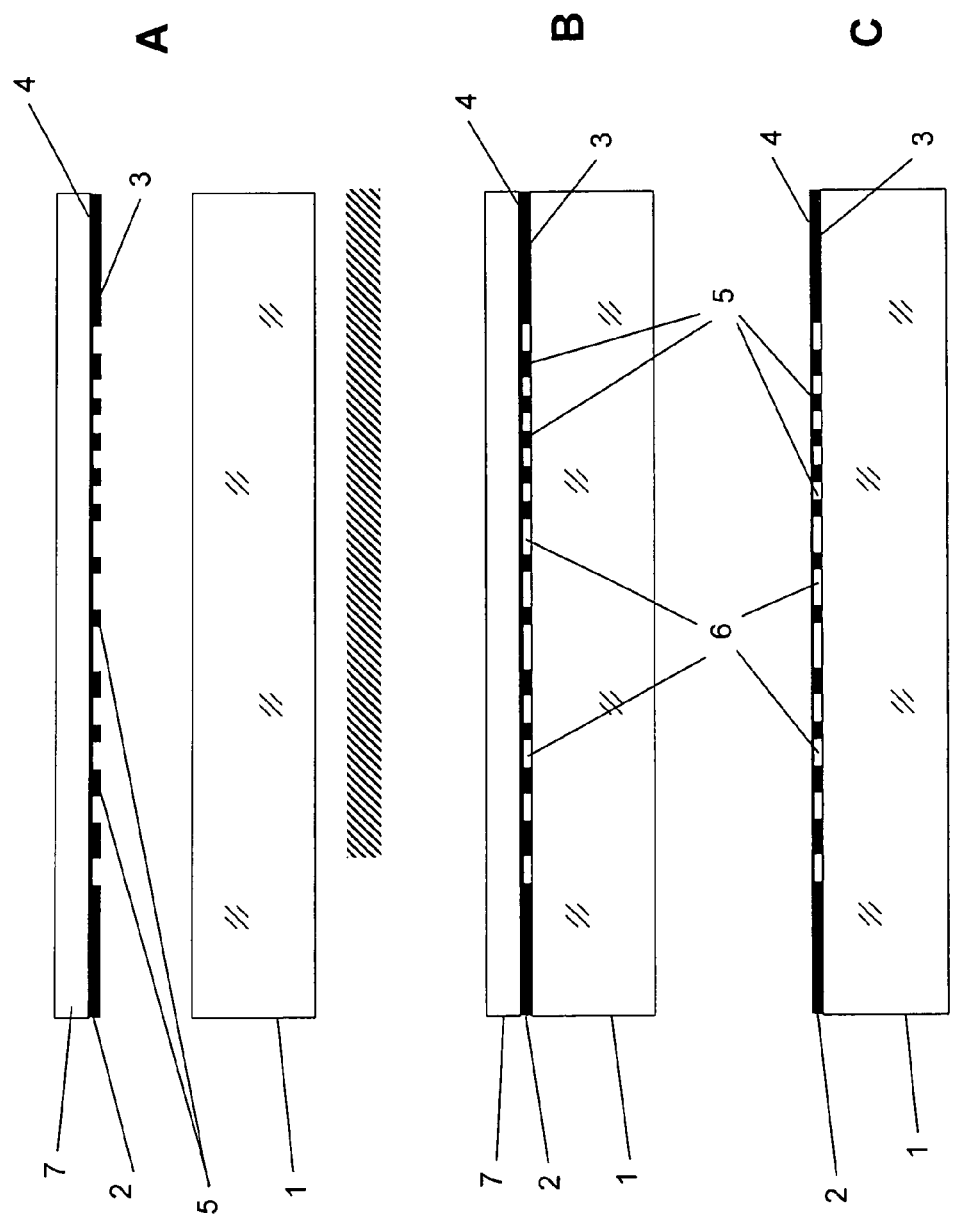
FIGS. 2A-C are cross-sectional views illustrating steps in a further method for the production of an embodiment of the diffractive element.

FIG. 2A shows a cross-section through the components of a diffractive element, which is characterized by a very thin functional substrate 2. A thicker carrier substrate 1, which in some embodiments has a thickness of about 30 mm, as well as a functional substrate 2 consisting of $SiO_2$ that is only a few micrometers thick, are applied onto an additional flat substrate 7, for example onto an Si wafer, with its second, unstructured side 4. The additional flat substrate 7 serves to stabilize the thin functional substrate 2 during the application or insertion of the fine structure 5 onto or into the first side 3 of the functional layer 2, as well as when connecting the carrier substrate 1 with the first side 3 of the functional substrate 2.

FIG. 2B shows a cross-section through the layer sequence of carrier substrate 1, functional substrate 2 and additional substrate layer 7 of the diffractive element in FIG. 2A after connecting the first side 3 that carries the fine structure 5 of the functional substrate 2 that is only a few micrometers thick with the carrier substrate 1. Between carrier substrate 1 and functional substrate 2, evacuated sections 6 are formed due to the use of a vacuum for connecting the flat substrates.

FIG. 2C shows the completed diffractive element after the additional substrate layer 7 of FIGS. 2A and 2B is selectively chemically removed. The diffractive element now consists of a thicker carrier substrate 1 and a functional substrate 2 that is only a few micrometers thick, the first side 3 of which carries the fine structure.

Thus, for each of the embodiments, a fine structure 5 is applied onto or inserted into a first side of a flat functional substrate 2. Subsequently, the flat functional substrate 2 is applied onto a more rigid, flat carrier substrate 1 with its first side. The flat carrier substrate 1 has, in addition to the higher degree of rigidity, a higher degree of surface flatness than the flat functional substrate 2 prior to the application onto or insertion of the fine structure 5. The application of the flat functional substrate 2 onto the flat carrier substrate 1 causes the flat carrier substrate 1, due to its higher degree of rigidity, to retain its surface flatness in relation to the flat functional substrate 2, and draws the boundary layer between the two flat substrates 1, 2 flat. Advantageously, the higher degree of rigidity of the flat carrier substrate 1 is achieved by means of a suitable choice of material for the flat carrier substrate 1 and/or by a corresponding thickness of the flat carrier substrate 1.

The relative thicknesses of the flat substrates 1, 2 are selected such that the more rigid flat carrier substrate 1 is thicker than the flat functional substrate 2 that provides optical function. For optical applications, the flat functional substrate 2 consists of a thickness of a few millimeters. In some embodiments, the thickness of the flat functional substrate 2 is less than or equal to about 4 mm and/or a thickness that is less than or equal to $\frac{1}{20}$ of the major dimension of the flat functional substrate 2. In further embodiments, the thickness of the flat functional substrate 2 is less than or equal to $\frac{1}{40}$ of the major dimension of the flat functional substrate 2.

In contrast, the flat carrier substrate 1 advantageously consists of a thickness that is greater than or equal to $\frac{1}{15}$ of the major dimension of the flat carrier substrate 1. In some embodiments, the thickness of the flat carrier substrate 1 is greater than or equal to $\frac{1}{8}$ of the major dimension of the flat carrier substrate 1. In further embodiments, the thickness of the flat carrier substrate 1 is greater than or equal to 5 mm. These thickness relationships are specified by the choice of the respective materials and the precise thickness specifications vary depending on the material used.

The diameter of the flat functional substrate 2, as well as the flat carrier substrate 1 is in the range of 100 mm to 500 mm, in particular in the range of 200 mm to 400 mm. In some embodiments, the diameter of both flat substrates 1, 2 is 300 mm.

In some embodiments, both flat substrates 1, 2 are permanently connected with each other, such as when the second side 4 of the flat functional substrate 2—after the application of the first side 3 of the flat functional substrate 2 onto the flat carrier substrate 1—is polished smooth. In some embodiments, the two flat substrates 1, 2 are detachably connected with each other.

The production of the permanent connection of the two flat substrates 1, 2 may be accomplished by means of the application of force, bonding and/or suitable adhesive methods. Additionally, the connection can be made or be supported by utilizing a vacuum. In this case, the first structured side of the flat functional substrate is positioned between the two flat substrates 1, 2. Preferably, the diffractive structure consists of recesses in the surface of the functional substrate. The vacuum is formed when these recesses are evacuated and the exterior air pressure presses the two flat substrates 1, 2 together. As long as the vacuum between the two flat substrates 1, 2 is maintained, the two substrates 1, 2 remain connected with each other.

In addition, the vacuum can have a supporting effect during the bonding and/or adhesion process.

In some embodiments, the two flat substrates 1, 2 contain the same materials or consist of the same materials. This may be advantageous, or required in certain cases for the different connection methods, and may also be expedient for a subsequent utilization in order to ensure the same thermal expansion coefficients.

For optical applications, at least the flat functional substrate 2 carries the fine structure 5, preferably, however, both flat substrates 1, 2 contain a material or consist of a material that is transparent and which is to be used for the range of wavelengths in which the diffractive element is to be used. For optical applications in the visible range of wave lengths, suitable is preferably $SiO_2$ and/or silicone.

The fine structure 5, in particular the microstructure and/or nanostructure on or in the first side 3 of the flat functional substrate 2 is preferably produced by means of lithographic processes such as electron beam lithography, laser lithography or photolithography.

Due to the fact that the first side 3 that carries the fine structure 5 of the flat functional substrate 2 is positioned between both flat substrates 1, 2, the following advantages result:

First, the interior structured first side 3 of the flat functional substrate 2 is protected against external influences such as, for example, dust, dirt or touch during handling of the diffractive element, and the cleaning of the diffractive element is also made easier, as only the unstructured second side 4 of the flat functional substrate 2 requires cleaning.

Second, there is the possibility of subsequently processing the second side 4 of the flat functional substrate 2. This may be necessary when both surfaces of the flat functional substrate 2, i.e. the first side 3 and the second side 4, are not sufficiently flat and/or parallel and thus the optical function of the entire diffractive element is malfunctioning. If the respective unevenness is known as a result of interferometric measurements, the unevenness can be reduced in a targeted manner by corresponding subsequent processing of the unstructured second side 4 of the flat functional substrate 2.

As is customary in the field, the flatness of the substrates is described as the deviation of the shape of the surface from that of an ideal level in a lateral dimension that is larger than 1 mm. Thus, the flatness can be defined and determined according to DIN ISO 10110 part 5 as form error of a flat substrate.

Typically, the deviations of thin, flat substrates, such as, for example, the functional substrate 2, are more than 5 μm from the ideal flatness level. As for optical applications, preferred flatness factors with deviations that are smaller than or equal to 0.5 μm. In some embodiments, the flatness deviation is less than or equal to 0.1 μm.

Possible methods for the subsequent processing of the unstructured second side 4 of the flat functional substrate 2 are polishing, preferably magnetorheologic polishing and/or ion beam etching (IBF), ion beam processing, and/or lapping.

For the production of a diffractive element with a high degree of wavefront precision, as well as the characteristics cited in the previous sections, first, a fine structure 5 is applied onto or inserted into a first side 3 of a flat functional substrate 2. The first side 3 of the flat functional substrate 2 is then applied to a more rigid, and, for example, thicker, flat carrier substrate 1 and connected with it.

Consequently, the surface of the first side 3 of the flat functional substrate 2 that carries the fine structure 5 is drawn flat due to being applied onto a flat carrier substrate 1 with a high degree of surface flatness. Subsequent processing of the second side 4 of the flat functional substrate 2 then leads to an improvement of the degree of wavefront precision of the entire diffractive element.

Preferably, this method can be applied in the production of diffractive elements with a high degree of wavefront precision, the flat substrate of which has a thickness of only a few micrometers. To do so, first, a fine structure 5 is applied onto or into a substrate layer 2 having a thickness that is smaller than or equal to a few millimeters. After application of the first side 3 of the flat functional substrate 2 onto the flat carrier substrate 1, a part of the original flat functional substrate can be removed from the second side 4 of the flat functional substrate 2. Magneto-rheologic polishing and/or ion beam etching are suitable methods. Such an approach in the production of diffractive elements is of advantage, as the processing of thicker and thus less fragile layers has been shown to be easier, while thin, flat functional substrates 2 are used in several production methods. Moreover, by means of this approach, the flatness and the parallelism of the first side 3 and second side 4 of the flat functional substrate 2 can be influenced.

In another embodiment of producing a diffractive element with a first substrate layer that has a thickness of only a few micrometers, a flat functional substrate 2 with a second side 4 is applied onto an additional flat substrate 7. Subsequently, a fine structure 5 is applied onto or inserted into the first side 3 of the flat functional substrate 2. Subsequently, the functional substrate 2 that had been applied to the additional substrate layer 7 is applied—with its first side 3 that carries the fine structure 5—onto a flat carrier substrate 1. After that, the additional flat substrate 7 can be selectively chemically removed. Thus it is possible, for example, to apply a flat functional substrate 2 consisting of $SiO_2$ that that is only a few micrometers thick, which is on a thin silicon wafer and carries an optically functional structure, onto a thicker, flat carrier substrate 1. Subsequently, the silicon wafer can be selectively chemically removed, so that only the thin $SiO_2$ layer having a thickness of only a few micrometers remains together with the interior fine structure 5 on the thick, flat carrier substrate 2. This method has been shown to be advantageous, as the distribution of the thickness of the layer of the $SiO_2$ layer that is only a few micrometers thick can be controlled very precisely and the two surfaces, i.e. the first side 3 and the second side 4, of the flat functional substrate 2 are largely parallel.

In some embodiments, the diffractive element generates a wave that has a wavefront error of at most one-quarter wavelength.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A diffractive element comprising:
   a flat functional substrate having a first side and a second side, wherein a diffractive fine structure is disposed on or in the first side of the flat functional substrate; and
   a flat carrier substrate coupled to the first side of the flat functional substrate, wherein the flat functional substrate and the flat carrier substrate are directly placed upon each other so as to form a boundary layer between the flat functional substrate and the flat carrier substrate, and wherein the flat carrier substrate has a higher degree of rigidity than the flat functional substrate, and wherein a degree of flatness of a surface of the flat carrier substrate is higher than a degree of flatness of the first side of the flat functional substrate prior to applying or inserting the diffractive fine structure.

2. The diffractive element of claim 1, wherein the flat carrier substrate is thicker than the flat functional substrate.

3. The diffractive element of claim 1, wherein the flat functional substrate has a thickness, a width and a breadth, and wherein the thickness of the flat functional substrate is at most $\frac{1}{20}$ of the greater of the width or the breadth of the flat functional substrate.

4. The diffractive element of claim 1, wherein the flat functional substrate has a thickness of at most 50 μm.

5. The diffractive element of claim 1 wherein the flat carrier substrate has a thickness, a width and a breadth, and wherein the thickness of the flat carrier substrate is at least $\frac{1}{15}$ of the greater of the width and the breadth of the flat carrier substrate.

6. The diffractive element of claim 1, wherein the flat functional substrate and the flat carrier substrate are permanently connected with each other.

7. The diffractive element of claim 6, wherein the flat functional substrate and the flat carrier substrate are permanently connected with the application of at least one of force, bonding, and vacuum suction.

8. The diffractive element of claim 1, wherein the flat functional substrate and the flat carrier substrate are comprised of the same material.

9. The diffractive element of claim 1, wherein the flat functional substrate comprises a transparent material.

10. The diffractive element of claim 1, wherein the diffractive fine structure is a lithographic structure on or in the first side of the flat functional substrate.

11. The diffractive element of claim 1, wherein the diffractive fine structure on or in the first side of the flat functional substrate is at least one of a microstructure and a nanostructure.

12. The diffractive element of claim 1, wherein the second side of the flat functional substrate is flat surface.

\* \* \* \* \*